(12) United States Patent
Tak

(10) Patent No.: US 6,585,318 B1
(45) Date of Patent: Jul. 1, 2003

(54) SAFETY SEAT

(76) Inventor: Chen Pak Tak, 3Fl., No. 49, Lane 118, Jungsan St., Shijr City, Taipei (TW)

( * ) Notice: Subject to any disclaimer, the term of this patent is extended or adjusted under 35 U.S.C. 154(b) by 0 days.

(21) Appl. No.: 10/158,869

(22) Filed: Jun. 3, 2002

(30) Foreign Application Priority Data

Dec. 19, 2001 (TW) ........................................ 90222323 U

(51) Int. Cl.⁷ .............................. B60N 2/42; B60R 21/00
(52) U.S. Cl. .............................. 297/216.13; 297/216.1; 297/216.12; 297/216.14
(58) Field of Search .................... 297/216.13, 216.14, 297/216.12, 216.1, 391, 188.01, 188.07, 188.13

(56) References Cited

U.S. PATENT DOCUMENTS

| | | | | |
|---|---|---|---|---|
| 1,827,928 A | * | 10/1931 | Berger | 248/582 |
| 4,856,848 A | * | 8/1989 | O'Sullivan et al. | 297/391 |
| 5,292,174 A | * | 3/1994 | Ohnuma | 297/188.06 |
| 5,816,650 A | * | 10/1998 | Lucas, Jr. | 297/188.1 |
| 5,927,803 A | * | 7/1999 | Hehl et al. | 280/756 |
| 6,062,642 A | * | 5/2000 | Sinnhuber et al. | 297/216.1 |
| 6,450,580 B1 | * | 9/2002 | Drew et al. | 297/301.2 |

* cited by examiner

Primary Examiner—Peter M. Cuomo
Assistant Examiner—Sarah C. Burnham
(74) Attorney, Agent, or Firm—Birch, Stewart, Kolasch & Birch, LLP

(57) ABSTRACT

A safety seat for transportation equipment. The safety seat comprises a back, a headrest and a cushion. The back, the headrest and the cushion respectively have at least one oil-pressure damper and at least one impact barricade disposed therein. The safety seat can absorb impact energy by the back, the headrest and the cushion when the transportation equipment is subject to an impact or running on an uneven road surface. Thus, the safety seat can protect the head, the neck, the back and the hips of a passenger from injury.

9 Claims, 4 Drawing Sheets

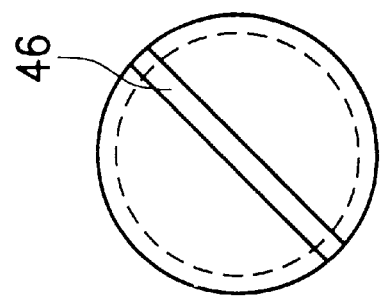
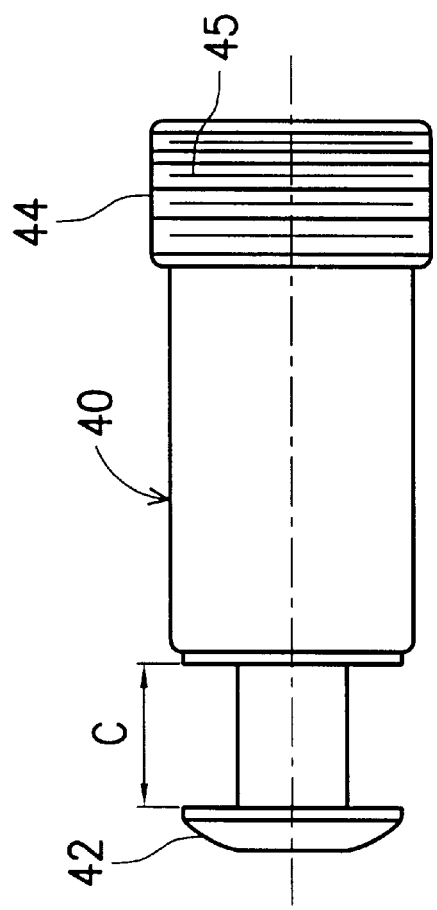
FIG. 4B
FIG. 4A

SAFETY SEAT

BACKGROUND OF THE INVENTION

1. Field of the Invention

The present invention relates to a safety seat, and in particular to a safety seat for transportation equipment.

2. Description of the Related Art

Generally speaking, when transportation equipment such as an automobile is subject to a front or rear impact, the back of a passenger moves rearward to hit the back of the seat, thus causing injury to the spine or back.

In addition, when the automobile is subject to an impact or running on a jolty road, the hips of the passenger move downward to hit the seat cushion, thus causing possible injury to the hips or spine.

Currently developed automobile seats cannot provide an effective solution to improve the aforementioned safety problems. Further, automobile seat manufacturers focus on promoting comfort of the automobile seats without developing safety seats that really protect passengers when a car accident occurs.

SUMMARY OF THE INVENTION

An object of the invention is to provide a safety seat for transportation equipment. The safety seat comprises a back having an upper portion, a lower portion, a rear inner wall, a rear portion, at least one first oil-pressure damper and at least one first impact barricade, the first oil-pressure damper and the first impact barricade disposed inside the back and the first oil-pressure damper spaced from the first impact barricade at a predetermined distance; a headrest connected to the upper portion of the back and having a rear inner wall, a rear portion, at least one second oil-pressure damper and at least one second impact barricade, the second oil-pressure damper and the second impact barricade disposed inside the headrest and the second oil-pressure damper spaced from the second impact barricade at a predetermined distance; and a cushion connected to the lower portion of the back and having a bottom inner wall, a bottom, at least one third oil-pressure damper and at least one third impact barricade, the third oil-pressure damper and the third impact barricade disposed inside the cushion and the third oil-pressure damper spaced from the third impact barricade at a predetermined distance.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 4A shows the oil-pressure damper of the invention;

FIG. 4B is a bottom view of the oil-pressure damper of the invention; and

DETAILED DESCRIPTION OF THE INVENTION

Figure 1:
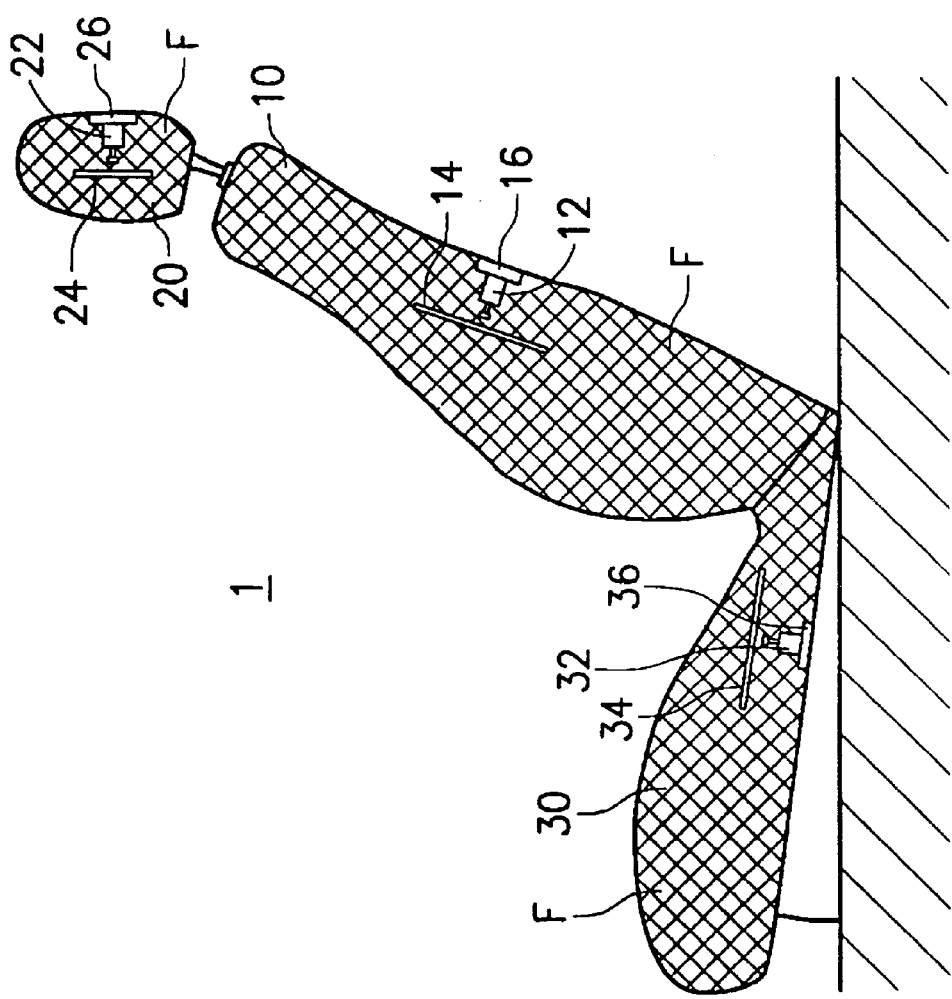
FIG. 1 is a perspective side view showing the safety seat of the invention.
Figure 3:
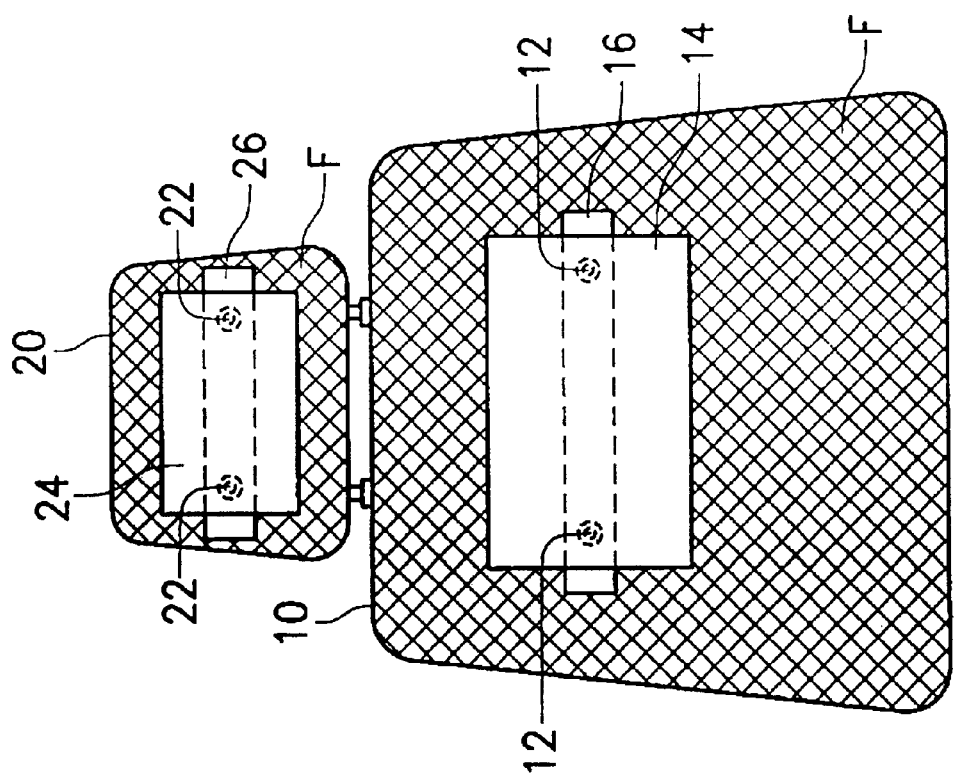
FIG. 3 is a cross-section along line A—A of FIG. 2.
Figure 2:
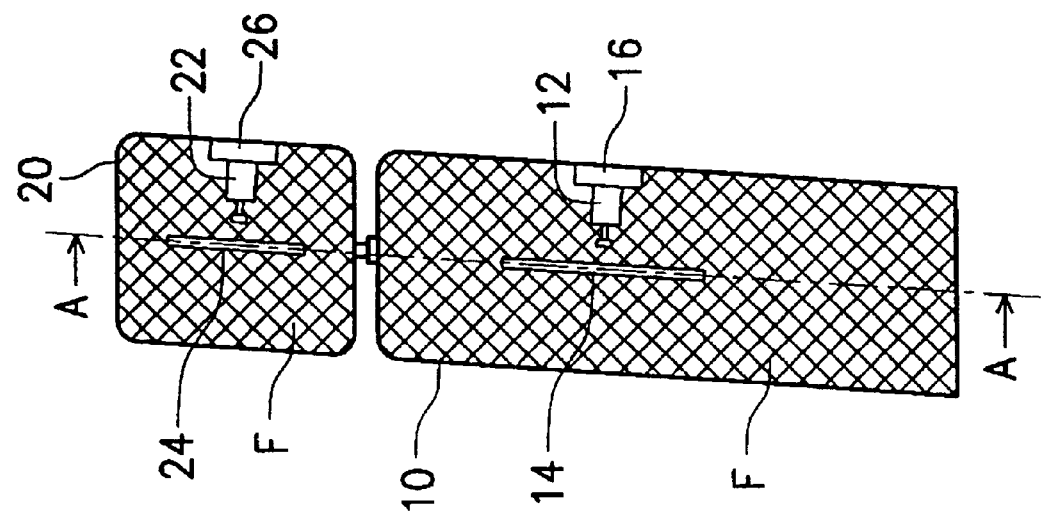
FIG. 2 is a perspective side view showing the headrest and the back of the invention.

Referring to FIG. 1, the safety seat 1 comprises a back 10, a headrest 20 and a cushion 30. The back 10, the headrest 20 and the cushion 30 are filled with foam sponges F. In this embodiment, as shown in FIG. 2 and FIG. 3, the back 10, the headrest 20 and the cushion 30 have two oil-pressure dampers and an impact barricade disposed therein.

Figure 5:
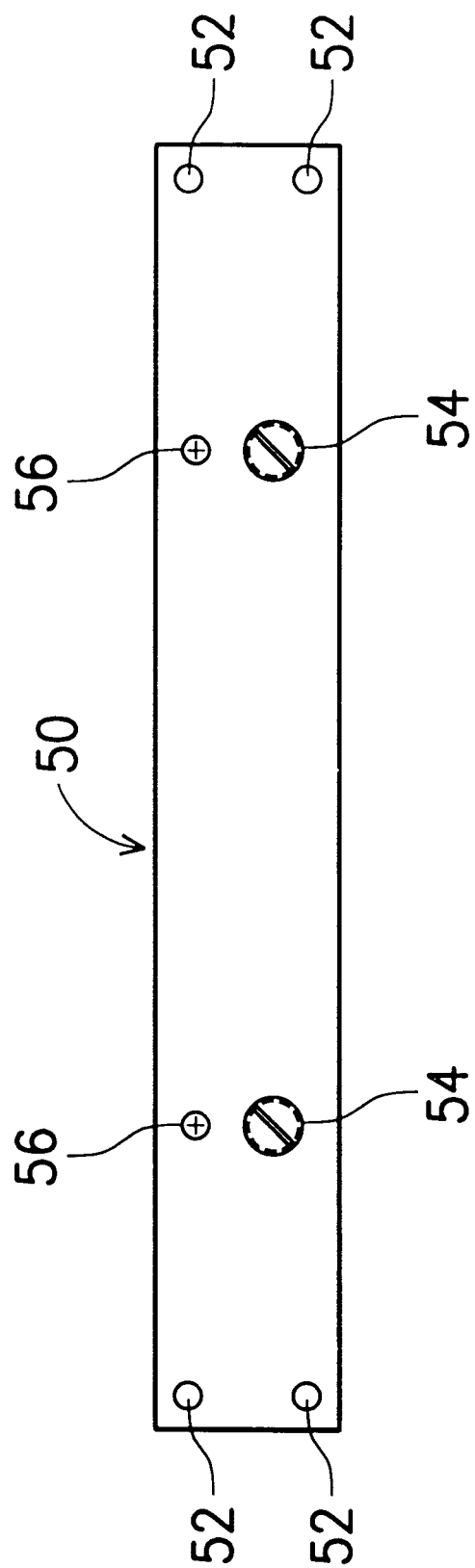
FIG. 5 is a plane view showing the mounting base of the oil-pressure damper of the invention.

Referring first to FIG. 4A, the stroke of the oil-pressure damper 40 is 12 mm. The arc end portion 42 of the oil-pressure damper 40 can eliminate side impact force. The fixing end 44 has threads 45 by which the oil-pressure damper 40 is whirled to a mounting base 50, as shown in FIG. 5. In FIG. 4A, the stroke C is 12 mm.

Referring to FIG. 4B, a groove 46 for assembling and disassembling the oil-pressure damper 40 is formed on the bottom of the fixing end 44.

Referring to FIG. 5, the mounting base 50 of the oil-pressure damper 40 comprises four mounting holes 52, two assembling holes 54 and two stop bolts 56. The two assembling holes 54 are used to assemble the oil-pressure damper 40 on the mounting base 50 and the two stop bolts 56 are used to prevent the oil-pressure damper 40 from unwinding due to shock.

Referring to FIG. 1, the impact barricades 14, 24 and 34 are made of a rigid material and are not required to have definite shapes. When an impact occurs, a part of the kinetic energy generated is absorbed by the foam sponges in the safety seat 1, and the other part of the kinetic energy is absorbed and dissipated by compression between the oil-pressure dampers and the impact barricades. In this embodiment, the distance between the oil-pressure damper and the impact barricade can be 1~2 mm.

In addition, three assembling doors (not shown) for assembling and maintaining the oil-pressure dampers are disposed on the rear portion of the back 10, the rear portion of the headrest 20 and the bottom of the cushion 30, respectively.

The heat generated by compression between an oil-pressure damper and an impact barricade is calculated as follows:

If the head of a passenger weighs 8 Kg and the impact speed of an automobile is 21.6 Km/Hr (6 m/s), the kinetic energy of the head before impact is $0.5 \times 8 \times 6^2 = 144$ N-m. According to the law of the conservation of energy, the kinetic energy 144 Nm can be absorbed by two oil-pressure dampers with a stroke of 12 mm. Thus, the heat converted from the kinetic energy after impact is 144 N-m.

The following description will explain the structure of the safety seat 1.

Referring to FIG. 1, FIG. 2 and FIG. 3, the back 10 has two first oil-pressure dampers 12 and a first impact barricade 14 disposed therein. The first impact barricade 14 is required to cover the two first oil-pressure dampers 12. The distance between the first oil-pressure damper 12 and the first impact barricade 14 is 2 mm. The first oil-pressure damper 12 is mounted on the rear inner wall of the back 10 by a first mounting base The headrest 20 is connected to the upper portion of the back 10 and has two second oil-pressure dampers 22 and a second impact barricade 24 disposed therein. Similarly, The second impact barricade 24 is required to cover the two second oil-pressure dampers 22. The distance between the second oil-pressure damper 22 and the second impact barricade 24 is 2 mm. The second oil-pressure damper 22 is mounted on the rear inner wall of the headrest 20 by a second mounting base 26.

The cushion 30 is connected to the lower portion of the back 10 and has two third oil-pressure dampers 32 and a third impact barricade 34 disposed therein. Similarly, the third impact barricade 34 is required to cover the two third oil-pressure dampers 32. The distance between the third oil-pressure damper 32 and the third impact barricade 34 is 2 mm. The third oil-pressure damper 32 is mounted on the bottom inner wall of the cushion 30 by a third mounting base 36.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A safety seat for transportation equipment, comprising:
   a back having an upper portion, a lower portion, a rear inner wall, a rear portion, at least one first oil-pressure damper and at least one first impact barricade, the first oil-pressure damper and the first impact barricade disposed inside the back and the first oil-pressure damper spaced from the first impact barricade at a predetermined distance;
   a headrest connected to the upper portion of the back and having a rear inner wall, a rear portion, at least one second oil-pressure damper and at least one second impact barricade, the second oil-pressure damper and the second impact barricade disposed inside the headrest and the second oil-pressure damper spaced from the second impact barricade at a predetermined distance; and
   a cushion connected to the lower portion of the back and having a bottom inner wall, a bottom, at least one third oil-pressure damper and at least one third impact barricade, the third oil-pressure damper and the third impact barricade disposed inside the cushion and the third oil-pressure damper spaced from the third impact barricade at a predetermined distance.

2. The safety seat as claimed in claim 1, wherein the back, the headrest and the cushion are filled with foam sponges.

3. The safety seat as claimed in claim 1, wherein the first oil-pressure damper is disposed on the rear inner wall of the back by a first mounting base.

4. The safety seat as claimed in claim 1, wherein the second oil-pressure damper is disposed on the rear inner wall of the headrest by a second mounting base.

5. The safety seat as claimed in claim 1, wherein the third oil-pressure damper is disposed on the bottom inner wall of the cushion by a third mounting base.

6. The safety seat as claimed in claim 1, wherein the first impact barricade, the second impact barricade and the third impact barricade are made of a rigid-material.

7. The safety seat as claimed in claim 1, wherein the rear portion of the back further comprises a first assembling door for assembling and disassembling the first oil-pressure damper and the first impact barricade.

8. The safety seat as claimed in claim 1, wherein the rear portion of the headrest further comprises(a second assembling door for assembling and disassembling the second oil-pressure damper any the second impact barricade.

9. The safety seat as claimed in claim 1, wherein the bottom of the cushion further comprises a third assembling door for assembling and disassembling the third oil-pressure damper and the third impact barricade.

* * * * *